United States Patent [19]
Ito et al.

[11] Patent Number: 5,513,045
[45] Date of Patent: Apr. 30, 1996

[54] FAST ASPHERICAL LENS SYSTEM

[75] Inventors: Takayuki Ito; Yasuyuki Sugano, both of Tokyo, Japan

[73] Assignee: Asahi Kogaku Kogyo Kabushiki Kaisha, Tokyo, Japan

[21] Appl. No.: 260,829

[22] Filed: Jun. 16, 1994

[30]        Foreign Application Priority Data

Jun. 16, 1993 [JP] Japan ................................ 5-145130

[51] Int. Cl.⁶ .................................................. G02B 13/04
[52] U.S. Cl. ............................ 359/750; 359/708; 359/754
[58] Field of Search .................................... 359/708, 749, 359/751, 750, 754, 755

[56]             References Cited
            U.S. PATENT DOCUMENTS

| | | |
|---|---|---|
| 3,738,738 | 6/1973 | Takahashi . |
| 3,870,402 | 3/1975 | Takahashi et al. . |
| 3,975,091 | 8/1976 | Takahashi . |
| 4,487,485 | 12/1984 | Hisada . |
| 4,566,764 | 1/1986 | Matsuo . |
| 5,162,945 | 11/1992 | Matsuo et al. . |
| 5,189,558 | 2/1993 | Ishii et al. ................................ 359/687 |

*Primary Examiner*—Georgia Y. Epps
*Assistant Examiner*—Dawn-Marie Bey
*Attorney, Agent, or Firm*—Greenblum & Bernstein

[57]                  ABSTRACT

A fast aspherical lens system is provided which includes a front lens group having a negative power, a diaphragm, and a rear lens group having a positive power, arranged in this order from the side of an object to be photographed. The rear lens group is provided with at least one lens having a diverging aspherical surface and satisfies the following conditions:

$$-0.6 < f/f_F < -0.2; \text{tm (1)}$$

$$3.0 < \Sigma d_{F+S}/f < 8.0; \quad (2)$$

$$3.0 < \Sigma d_R/f < 6.0; \quad (3)$$

$$-0.9 < \Delta I_{ASP} < -0.1; \quad (4)$$

where f represents a focal length of the entire lens system, $f_F$ represents a focal length of the front lens group, $\Sigma d_{F+S}$ represents a sum of the thickness of the front lens group and a distance between the front lens group and the rear lens group, and $\Sigma d_r$ represents a thickness of the rear lens group, and $\Delta I_{ASP}$ represents an aberration factor of the aspherical surface term of the third-order spherical aberration factor of the aspherical lens.

9 Claims, 5 Drawing Sheets front lens group    rear lens group

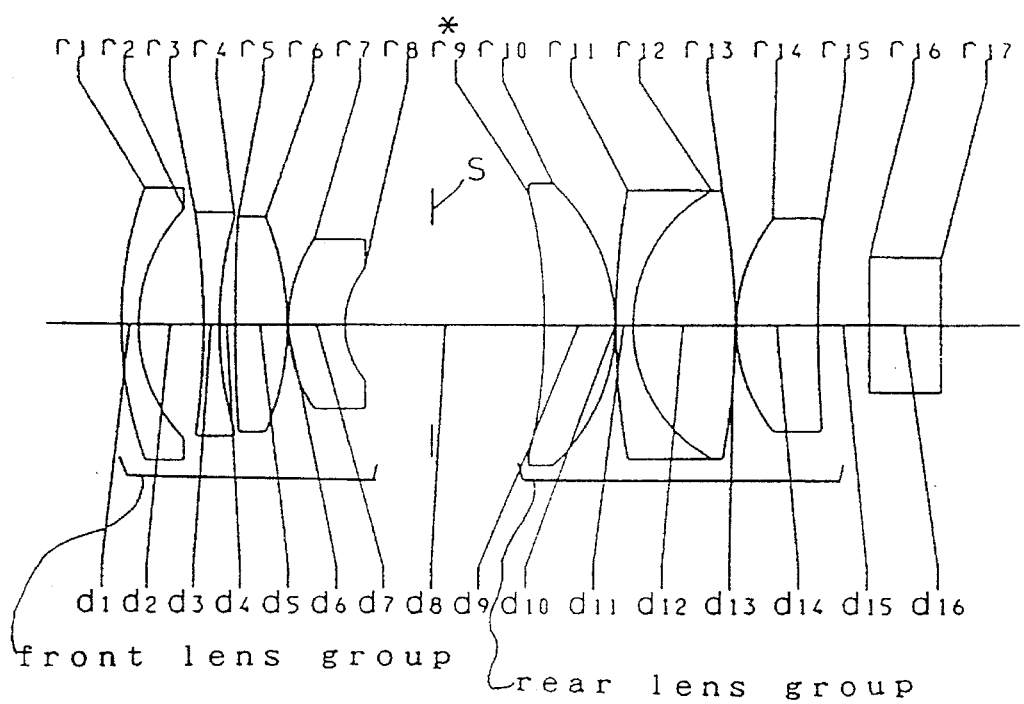
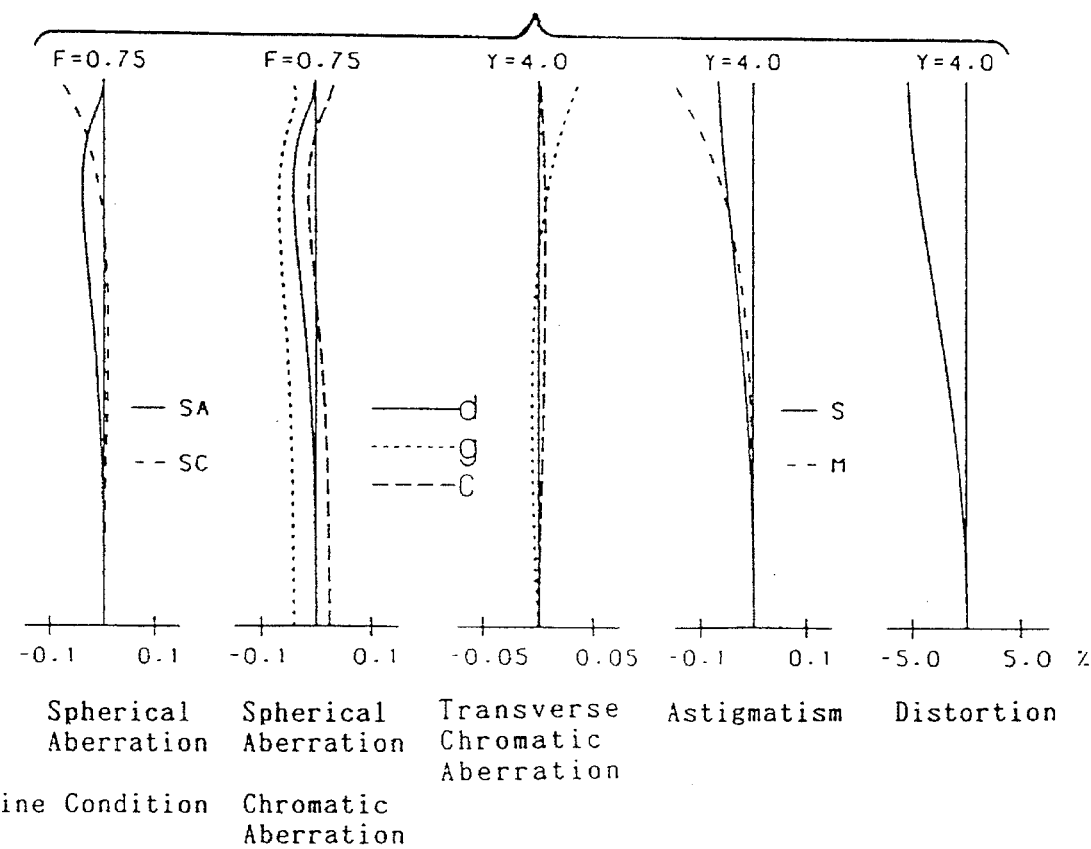

front lens group  rear lens group

FAST ASPHERICAL LENS SYSTEM

BACKGROUND OF THE INVENTION

1. Field of the Invention

The present invention relates to a fast wide angle lens system which can be advantageously used with a small TV camera, such as a CCTV camera or the like.

2. Description of Related Art

In a known small TV camera, a small image pickup device having high resolution whose pixels are small is generally used. Therefore, a fast lens having a small f-number is required as a photographing lens, i.e., filming lens. In the conventional fast lenses, however, the f-number is approximately F1.0 to F1.2.

It is an object of the present invention to provide a fast wide angle lens having extremely small f-number, i.e., a round F 0.75.

SUMMARY OF THE INVENTION

To achieve the object mentioned above, according to an aspect of the present invention, a fast aspherical lens system is provided which has a front lens group having negative power, a diaphragm, and a rear lens group having a positive power, located in this order from an object to be photographed, wherein at least a lens having diverging aspherical surface is provided. The lens system satisfies the following conditions (1) through (4):

$$-0.6 < f/f_F < -0.2 \quad (1)$$

$$3.0 < \Sigma d_{F+S}/f < 8.0 \quad (2)$$

$$3.0 < \Sigma d_R/f < 6.0 \quad (3)$$

$$-0.9 < \Delta I_{ASP} < -0.1 \quad (4)$$

wherein, f represents a focal length of the entire lens system, $f_F$ represents a focal length of the front lens group, $\Sigma d_{F+S}$ represents a sum of the thickness of the front lens group and a distance between the front lens group and the rear lens group, $\Sigma d_R$ represents a thickness of the rear lens group, and, $\Delta I_{ASP}$ represents an aberration factor of the aspherical surface term of the third-order spherical aberration factor of the aspherical lens (i.e., aberration factor when a focal length is converted to be 1.0).

Preferably, the aspherical surface is provided in the rear lens group and satisfies the following relationship (5);

$$|I_{SP}/\Delta I_{ASP}| < 0.3 \quad (5)$$

wherein $I_{SP}$ represents an aberration factor of the spherical surface term of a third-order spherical aberration factor of the aspherical lens.

The amount of variation in the coefficient of the third order aberration due to the aspheric surface will now be described. The shape of the aspheric surface can be generally expressed as follows.

$$X = \frac{CY^2}{1 + \{1 - (1+K)C^2Y^2\}^{1/2}} +$$

$$A_4 Y^4 + A_6 Y^6 + A_8 Y^8 + A_{10} Y^{10} + \ldots$$

wherein, Y represents a height above the axis,

X represents a distance from a tangent plane of an aspherical vertex,

C represents a curvature of the aspherical vertex (1/r), k represents a conic constant, $A_4$ represents a fourth-order aspherical aberration factor, $A_6$ represents a sixth-order aspherical aberration factor, $A_8$ represents a eighth-order aspherical aberration factor; and, $A_{10}$ represents a tenth-order aspherical aberration factor.

When the focal length f is 1.0, the resultant value is transformed as follows. Namely, substitute the following equations into the above equation:

$$X=x/f, \ Y=y/f, \ C=fc \ \alpha_4=f^3 A_4, \ \alpha_6=f^5 A_6, \ \alpha_8=f^7 A_8, \ \alpha_{10}=f^9 A_{10}$$

In this way, the following equation is obtained.

$$X = \frac{CY^2}{1 + (1 - C^2 Y^2)^{1/2}} + \alpha_4 Y^4 + \alpha_6 Y^6 + \alpha_8 Y^8 + \alpha_{10} Y^{10} + \ldots$$

The second and subsequent terms define the amount of asphericity of the aspheric surface.

The relationship between the coefficient $A_4$ of the second term and the coefficient of the third-order aspheric surface $\Phi$ is expressed by:

$$\Phi = 8(N'-N)\alpha_4$$

wherein N is the refractive index of a material nearer the object side with regard to the aspherical surface, and N' is the refractive index of a material behind the aspherical surface.

The coefficient of the aspherical surface $\Phi$ provides the following amounts of variation in the coefficients of the various kinds of third-order aberration.

$$\Delta I = h^4 \Phi$$

$$\Delta II = h^3 k \Phi$$

$$\Delta III = h^2 k^2 \Phi$$

$$\Delta IV = h^2 k^2 \Phi$$

$$\Delta V = h k^3 \Phi$$

wherein I is the spherical aberration coefficient,

II is the coma coefficient,

III is the astigmatism coefficient,

IV is the curved surface coefficient of aspherical image absent surface,

V is a distortion coefficient, h is the height of paraxial on-axis rays passing through each lens surface; and, k is the height of paraxial and off-axis rays passing through the center of the pupil and each lens surface.

The shape of the aspheric surface can be expressed by various other equations but when y is smaller than the paraxial radius of curvature, satisfactory approximation can be achieved by even-order terms alone. Hence, it should be understood that the applicability of the present invention is in no way compromised by merely changing the equations for expressing the shape of the aspheric surface.

$\Delta I$ set forth in the above corresponds to $\Delta I_{ASP}$ in the present invention.

In an embodiment, the rear lens group is comprised of three lens groups having four lenses, i.e., a first lens of positive power having a convex surface of larger curvature facing an image surface, a second lens of negative power and a third lens of positive power, a fourth lens of positive power having a convex surface of a larger curvature facing the object side, located in this order from the object side. The second lens is cemented to the third lens and the cemented lens assembly, in which cemented surfaces is concave with respect to the image surface. In this embodiment, the rear lens group satisfies the following conditions (6) through (10);

$$1.67 < N_P \tag{6}$$

$$1.75 < N_N \tag{7}$$

$$-4.0 < r_{R1\text{-}2}/f < -1.9 \tag{8}$$

$$1.5 < r_{R3\text{-}1}/f < 3.0 \tag{9}$$

$$1.5 < r_{RC}/f < 3.0 \tag{10}$$

wherein, $N_P$ represents a mean value of a refractive index of the positive lens of the rear lens group, $N_N$ represents a refractive index of the negative lenses of the rear lens group, $r_{R1\text{-}2}$ represents a radius of curvature of the surface of the first lens nearer to the image surface in the rear lens group, $r_{RC}$ represents a radius of curvature of the cementing surface of the cemented lenses in the rear lens group, $r_{R3\text{-}1}$ represents a radius of curvature of a surface of the terminal lens nearer the object in the rear lens group.

The front lens group, which has negative power as a whole, can be comprised of at least three combinations of lenses; i.e., a combination of a first negative lens, a second negative lens, a third positive lens, and a fourth negative lens, (combination 1); a combination of a first negative lens, a second positive lens, a third negative lens, and a fourth positive lens (combination 2); or a combination of a first negative lens, a second positive lens, a third negative lens, and a fourth negative lens (combination 3). These lenses are assembled in this order from the object side.

In combination 1, the fourth negative lens is a meniscus lens having a concave surface of a larger curvature facing the image surface and satisfies the following condition (11);

$$1.0 < r_{F4\text{-}2}/f < 2.0 \tag{11}$$

wherein, $r_{F4\text{-}2}$ represents a radius of curvature of the surface of the fourth lens nearer the image surface in the front lens group.

In combination 2, the third negative lens is a negative meniscus lens having a concave surface of larger curvature facing the image surface and satisfies the following formula (12);

$$1.0 < r_{F3\text{-}2}/f < 2.0 \tag{12}$$

wherein, $r_{F3\text{-}2}$ represents a radius of curvature of the surface of the third lens nearer the image surface in the front lens group.

In combination 3, the third negative lens is a negative meniscus lens having a concave surface of larger curvature facing the image surface and satisfies the following condition (13);

$$1.0 < r_{F3\text{-}2}/f < 2.0 \tag{13}$$

wherein, $r_{F3\text{-}2}$ represents a radius of curvature of the surface of the third lens nearer the image surface in the front lens group.

The present disclosure relates to subject matter contained in Japanese patent application No. 05-145130 (filed on Jun. 16, 1993) which is expressly incorporated herein by reference in its entirety.

BRIEF DESCRIPTION OF THE DRAWINGS

The invention will be described below in detail with reference to the accompanying drawings, in which;

FIG. 3 is a schematic view of a lens arrangement of the fast aspherical lens system according to a second embodiment of the present invention;

FIG. 4 shows diagrams of various aberrations in the fast aspherical lens system shown in FIG. 3;

DESCRIPTION OF THE PREFERRED EMBODIMENT

Figure 1:
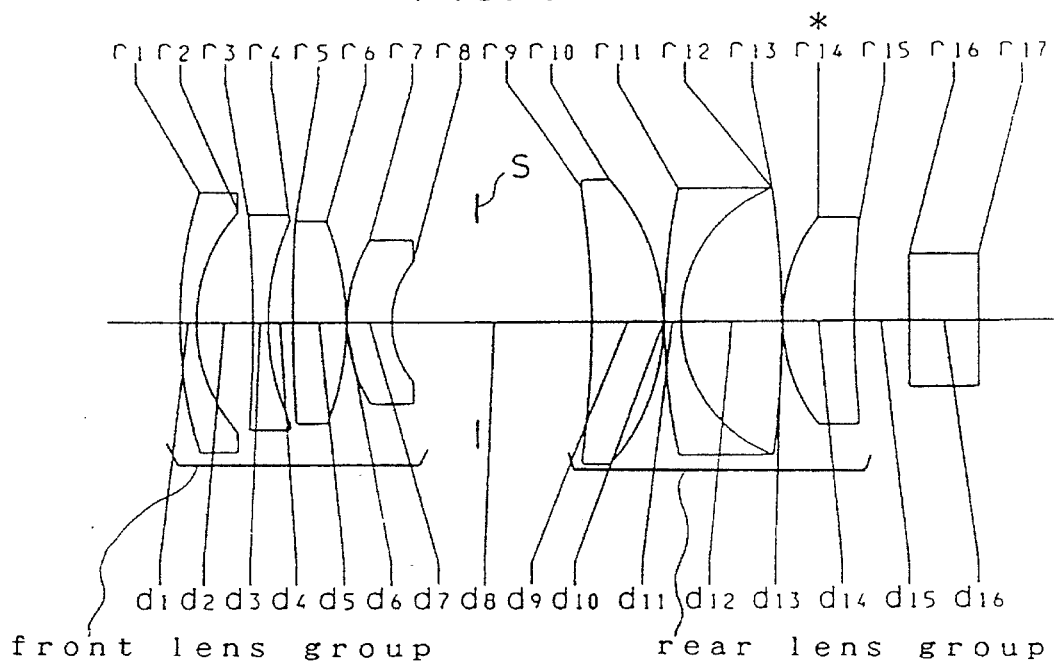
FIG. 1 is a schematic view of a lens arrangement of a fast aspherical lens system according to a first embodiment of the present invention.

A fast aspherical lens according to the present invention is a retrofocus-type wide angle lens, comprised of a front lens group having negative power and a rear lens having positive power, located in this order from a side of the object to be photographed. Namely, according to one of the most significant features of the present invention, the fast lens is provided with a lens having a diverging aspherical surface. The lens having a diverging aspherical surface is preferably provided in the rear lens group, which is located behind a diaphragm with respect to the object, and where a large axial bundle of rays is obtained, in order to sufficiently compensate for the spherical and comatic aberration. The diverging aspherical surface refers to a surface whose shape is such that a curvature decreases (i.e., a radius of curvature increases) toward the peripheral edge of the lens when the convex surface forms an aspherical surface as shown in FIG. 1 (first embodiment). Or a curvature increases (i.e., a radius of curvature decreases) toward the peripheral edge of the lens, when the concave surface is aspherical as shown in FIG. 3 (second embodiment). In the simplest structure, the diaphragm is provided between the front and rear lens groups that are provided so as to satisfy the condition (1). This makes it possible to reduce the lens diameters of the front and rear lens groups and the aperture diameter while keeping the balance between the lens groups. Moreover, in a small TV camera as mentioned above, in which an ND filter is usually provided in the vicinity of the diaphragm, the provision of the diaphragm between the front lens and the rear lens group, in connection with the requirement represented by condition (1), $-0.6<f/f_F<-0.2$, where f is the focal length of the entire lens system and $f_F$ is the focal length of the front lens group, contributes to eliminate a ghost image due to the reflection of light by the surfaces of the ND filter and the image pickup device. The formula (1) is related to the power of the front lens group. If the value of $f/f_F$ exceeds the upper limit of 0.2, the backfocal distance decreases, resulting in a difficulty in incorporating the lens system in the camera. Conversely, if the value of $f/f_F$ is below the lower limit of 0.6, not only increases the entire lens length but also makes a high-order aberration occur within the front lens group. Consequently, it is very difficult to compensate the aberration. Moreover, the optical efficiency of the lens system can be easily deteriorated by a possible manufacturing error.

The condition (2), $3.0<\Sigma d_{F+S}/f<8.0$, where $\Sigma d_{F+S}$ is the sum of the thickness of the front lens group and the distance between the front lens group and the rear lens group, refers to a requirement for increasing the angle of view and for decreasing a value of f-number, represented by a sum of the distance between a surface of the first lens nearer the object side in the front lens group and a surface of the first lens nearer the object side in the rear lens group. If the value of the ratio in condition (2) exceeds the upper limit of 8.0, not only the entire lens length but also the diameter of the front lens group increases. Conversely, if the value is below the lower limit of 3.0, a back-focal distance cannot be increased and the compensation of the aberration will be difficult.

The condition (3), $3.0<\Sigma d_R/f<6.0$, where $\Sigma d_R$ is the thickness of the rear lens group, refers to a requirement to increase the aperture ratio, in connection with the lens thickness of the rear lens group. If the value of the ratio in condition (3) exceeds the upper limit of 0.6, not only the entire lens length but also the diameter of the rear lens group increases. Conversely, if the value is below the lower limit of 3.0, it is impossible to obtain a wide angle lens having F0.75.

The condition (4), $-0.9<\Delta I_{ASP}<-0.1$, where $\Delta I_{ASP}$ is an aberration factor of the aspherical surface term of the third-order spherical aberration factor of the aspherical lens, specifies the divergence of the aspherical surface. As mentioned above, the diverging aspherical surface refers to a surface whose shape is such that the curvature decreases (i.e., radius of curvature increases) toward the peripheral edge of the lens if the convex surface is aspherical as shown in FIG. 1 (first embodiment). Or the curvature increases (i.e., radius of curvature decreases) toward the peripheral edge of the lens if the concave surface is aspherical as shown in FIG. 3 (second embodiment).

If the value of $\Delta I_{ASP}$ exceeds the upper limit of 0.1, an insufficient aspherical surface effect may be expected. Accordingly, it will be difficult to compensate the spherical aberration or the comatic aberration. Conversely, if the value is below the lower limit of 0.9, a high-order aberration tends to occur due to an excessive compensation of the aberration.

The condition (5) $|I_{SP}/\Delta I_{ASP}|<0.3$, where $\Delta I_{SP}$ is an aberration factor of the spherical surface term of the third-order spherical aberration factor of the aspherical lens, specifies the location of the aspherical surface. The aspherical surface is preferably provided on a surface having a spherical surface term of the spherical aberration factor which satisfies the condition (5), since the optical efficiency of the lens system is less likely to be deteriorated by possible manufacturing error.

The conditions (6) through (10) are related to the rear lens group. To obtain a fast lens system having f-number F0.75, both the positive lens and the negative lens are preferably made of a material having a refractive index higher than the lower limit in the condition (6) $1.67<N_P$, where $N_P$ is a mean value of a refractive index of the positive lens of the rear lens group, and (7). $1.75<N_N$, where $N_N$ is a refractive index of the negative lenses of the rear lens group. If the refractive indexes are smaller than the lower limit, it is necessary to increase the thickness of the lenses in order to obtain a sufficient thickness at the peripheral edge of the lenses. Consequently, a high-order aberration tends to occur due to an increase in the curvature of the lens.

The condition (8) $-4.0<r_{R1-2}/f<-1.9$, where $r_{R1-2}$ is a radius of curvature of the surface of the first lens nearer to the image surface in the rear lens group, and (9) $1.5<r_{R3-1}/f<3.0$, where $r_{R3-1}$ is a radius of curvature of a surface of the terminal lens nearer the object in the rear lens group, specify a radius of curvature of the first and fourth positive lenses of the rear lens group located nearest to the object side and nearest to the image surface. These conditions are required to compensate an excessive compensation in the positive direction of the spherical aberration in the negative front lens group.

If the ratio defined by the formula (8) exceeds the upper limit of $-1.9$ or the ratio defined by the formula (9) is less than the lower limit of 1.5, the power of the surface having positive power will be too high, resulting in a negative spherical aberration, and in a high-order aberration.

Conversely, if the ratio defined by the formula (8) is smaller than the lower limit of $-4.0$ or the ratio defined by formula (9) is larger than the upper limit of 3.0, the surface power is too small to compensate the spherical aberration caused in the front lens group in the positive direction. Moreover, since the positive surface power (burden) is shared by a surface of the rear lens group nearer the object side and a surface of the rear lens group nearer the image surface, the burden on each lens surface is reduced by half. Consequently, little or no high-order aberration occurs, and in addition, the comatic aberration can be effectively compensated.

The condition (10) $1.5<r_{RC}/f<3.0$, where $r_{RC}$ is a radius of curvature of the cementing surface of the cemented lenses in the rear lens group, specifies a radius of curvature of the cementing surface of the cemented lenses. The requirement defined by the condition (10) is necessary for compensating the chromatic and spherical aberration occurred in the rear lens group. If the ratio defined by the condition (10) exceeds the upper limit 3.0, it is impossible to correct the aberration caused by the positive surface power of the rear lens group in connection with the conditions (8) and (9). Conversely, if the ratio defined by the condition (10) is smaller than the lower limit of 1.5, the aberrations will be overcompensated.

The front lens group of the negative power may be comprised of the following combinations; a combination of a negative lens, a negative lens, a positive lens and a negative lens, located in this order from the object side; a combination of a negative lens, a positive lens, a negative lens, and negative lens located in this order from the object side; and, a combination of a negative lens, a positive lens, a negative lens, and a negative lens, located in this order from the object side. The provision of a positive lens within the front lens group of negative power contributes to the efficient compensation of the distortion.

In the lens arrangements of the front lens group having negative power mentioned above, it is preferable that the concave lens surfaces of a largest curvature facing the image surface in the front lens group satisfies the conditions (11), $1.0 < r_{F4-2}/f < 2.0$, where $r_{F4-2}$ is a radius of curvature of the surface of the fourth lens nearer the image surface in the front lens group, (12) $1.0 < r_{F3-2}/f < 2.0$, where $r_{F3-2}$ is a radius of curvature the surface of the third lens nearer the image surface in the front lens group, and (13) $1.0 < r_{F3-2}/f < 2.0$. If the ratios defined by the formulae (11), (12) and (13) exceed the respective upper limits, it is difficult to correct the astigmatism. In addition to that, since the negative surface power decreases, back-focal distance cannot be increased.

Conversely, if the ratios in the formulae (11), (12) and (13) are smaller than the respective lower limits, the negative surface power is too large. Therefore, spherical and comatic aberration will be excessively compensated, and a high-order aberration tends to occur.

First Embodiment:

FIG. 1 shows a first embodiment of a lens system arrangement of a fast aspherical lens according to the present invention.

Hereinafter, the front lens group is referred to as the lens group I and the rear lens group is referred to as the lens group II.

The first lens group I located in front of a diaphragm S with respect to an object is comprised of first through fourth lenses. The second lens group II located behind the diaphragm S with respect to an object includes fifth through eighth lenses. The sixth lens and the seventh lenses are cemented to one another. Behind the eighth lens with respect to an object, a plane-parallel plate is provided.

Figure 2:
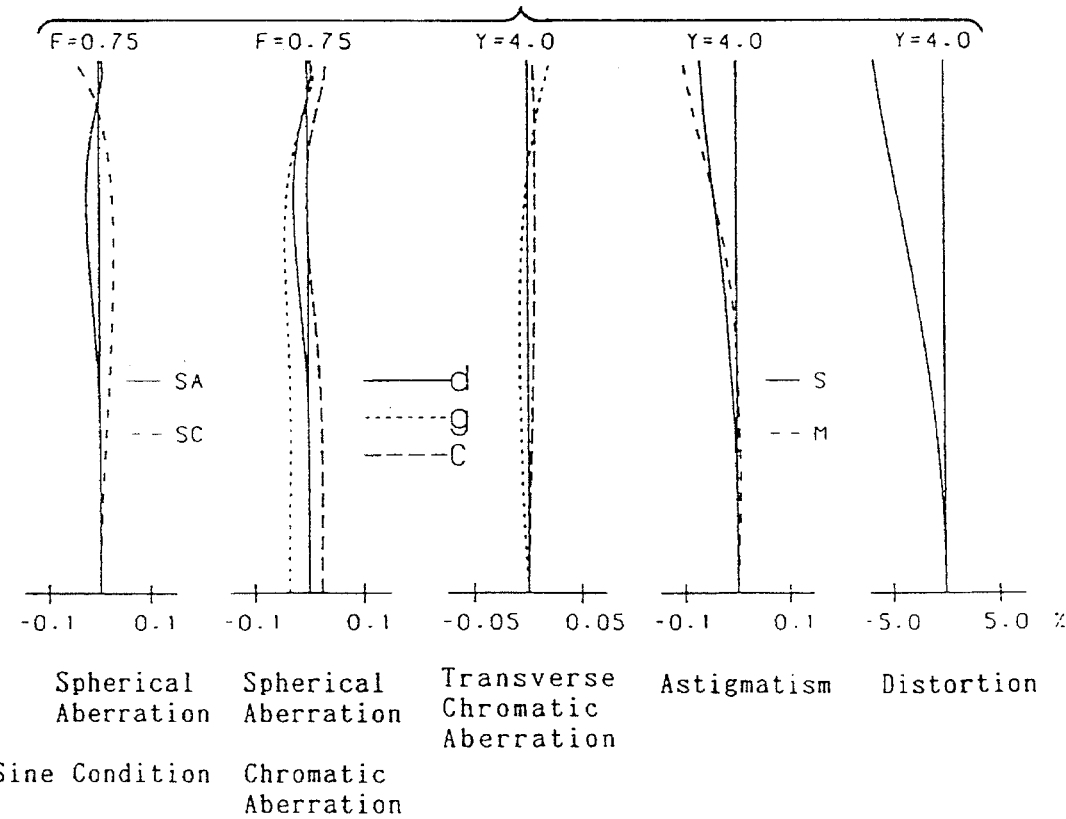
FIG. 2 shows diagrams of various aberrations in the fast aspherical lens system shown in FIG. 1.

Designations $r_1$–$r_{17}$ represent the radius of curvature for each given lens surface. Designations $d_1$–$d_{16}$ represent either the lens thickness or the distance between lenses. Diagrams of various aberrations of the lens system are shown in FIG. 2. In FIG. 2, "SA" represents a spherical aberration and "SC" represents a sine condition. The "d-line", "g-line" and "C-line" designates a chromatic and a transverse chromatic aberration, represented by the spherical aberration, at the respective wavelengths. "S" represents the sagittal ray, and "M" represents the meridional ray.

Numerical data of the lens system shown in FIG. 1 is shown in Table 1 below.

In Table 1, "$r_i$" represents the radius of curvature of each lens surface, wherein i=1, 2, 3, . . . , "$d_i$" represents the lens thickness or the distance between the lenses, wherein i=1, 2, 3. . . "N" represents the refractive index, and "ν" represents the Abbe number.

TABLE 1

$F_{NO} = 1:0.75$
$f = 6.20$
$\omega = 34.7$
$F_B = d_{15} + d_{16}$ (in glass) = 10.94
wherein, $F_{NO}$ represents f-number,
f represents a focal length,
ω represents a half angle of view; and,
$f_B$ represents a back focal length.

| Surface No. | r | d | N | ν |
|---|---|---|---|---|
| 1 | 35.829 | 1.49 | 1.77250 | 49.6 |
| 2 | 14.335 | 4.91 | | |
| 3 | −112.034 | 1.29 | 1.51633 | 64.1 |
| 4 | 21.403 | 2.16 | | |
| 5 | 155.159 | 4.49 | 1.84666 | 23.8 |
| 6 | −24.296 | 0.10 | | |
| 7 | 13.937 | 3.74 | 1.84666 | 23.8 |

TABLE 1-continued $F_{NO} = 1:0.75$
$f = 6.20$
$\omega = 34.7$
$F_B = d_{15} + d_{16}$ (in glass) = 10.94
wherein, $F_{NO}$ represents f-number,
f represents a focal length,
ω represents a half angle of view; and,
$f_B$ represents a back focal length.

| Surface No. | r | d | N | ν |
|---|---|---|---|---|
| 8 | 8.225 | 17.52 | | |
| 9 | −75.160 | 6.36 | 1.77250 | 49.6 |
| 10 | −18.342 | 0.10 | | |
| 11 | 52.875 | 1.49 | 1.84666 | 23.8 |
| 12 | 12.314 | 9.11 | 1.77250 | 49.6 |
| 13 | −78.843 | 0.10 | | |
| 14 | *14.223 | 6.36 | 1.66910 | 55.4 |
| 15 | 76.838 | 4.94 | | |
| 16 | ∞ | 6.00 | 1.49782 | 66.8 |
| 17 | ∞ | | | |

*marked surface is aspherical.

surface no. 14;

K=0.0, A4=−0.10940×10⁻⁴, A6=0.12483×10⁻⁷,
A8=−0.19506×10⁻⁸, A10=0.97455×10⁻¹¹, A12=0.0
Aspherical surface is defined as follows;

$$x = cy^2 / \{1 + [1-(1+K)c^2y^2]^{1/2}\} + A4y^4 + A6y^6 + A8y^8 + \ldots$$

Second Embodiment:

FIG. 3 shows a lens arrangement of the fast aspherical lens system according to a second embodiment of the present invention.

Numerical data of the lens system shown in FIG. 3 is shown in Table 2 below. Diagrams of various aberrations of the lens system are shown in FIG. 3.

TABLE 2

$F_{NO} = 1:0.75$
$f = 6.20$
$\omega = 34.3$
$F_B = d_{15} + d_{16}$ (in glass) = 10.55

| surface No. | r | d | N | ν |
|---|---|---|---|---|
| 1 | 33.129 | 1.50 | 1.77250 | 49.6 |
| 2 | 14.011 | 5.65 | | |
| 3 | −62.988 | 1.30 | 1.56873 | 63.1 |
| 4 | 33.220 | 1.37 | | |
| 5 | 149.530 | 4.34 | 1.84666 | 23.8 |
| 6 | −24.658 | 0.10 | | |
| 7 | 13.545 | 4.70 | 1.84666 | 23.8 |
| 8 | 7.461 | 16.95 | | |
| 9 | *−50.944 | 6.14 | 1.74320 | 49.3 |
| 10 | −15.982 | 0.10 | | |
| 11 | 62.553 | 1.50 | 1.84666 | 23.9 |
| 12 | 12.817 | 9.03 | 1.77250 | 49.6 |
| 13 | −58.213 | 0.10 | | |
| 14 | 14.475 | 7.17 | 1.65160 | 58.5 |
| 15 | 108.754 | 4.55 | | |
| 16 | ∞ | 6.00 | 1.49782 | 66.8 |
| 17 | ∞ | | | |

*marked surfaces is aspherical surface no. 9;

K=0.0, A4=−0.18641×10⁻⁴, A6=0.86364×10⁻⁷,
A8=−0.43924×10⁻⁹, A10=0.10500×10⁻¹¹, A12=0.0

Figure 5:
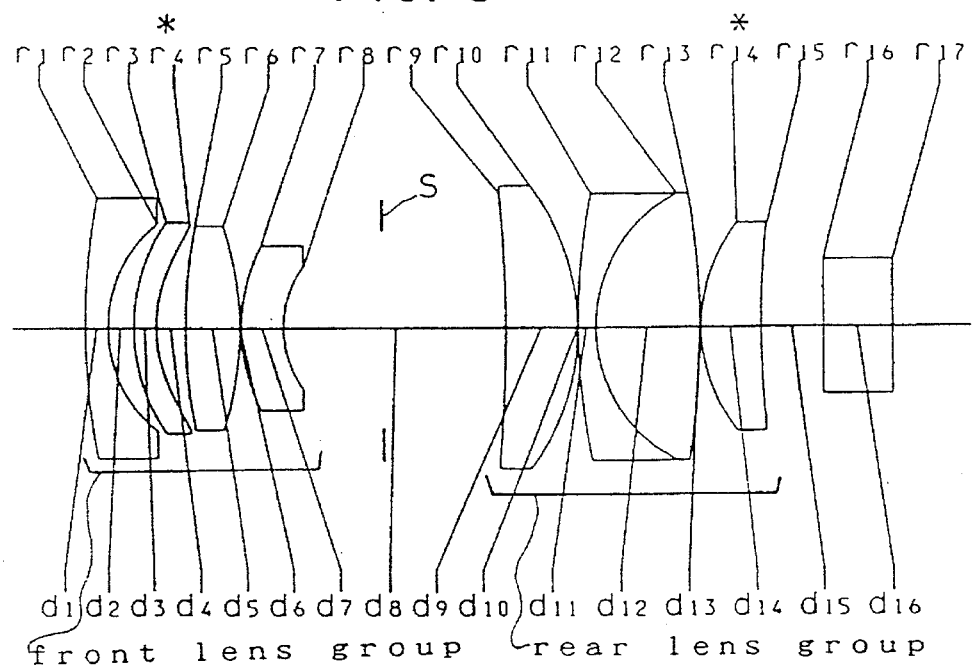
FIG. 5 is a schematic view of a lens arrangement of the fast aspherical lens system according to a third embodiment of the present invention.

Third Embodiment:

FIG. 5 shows a lens arrangement of the fast aspherical lens system according to a third embodiment of the present invention.

Figure 6:
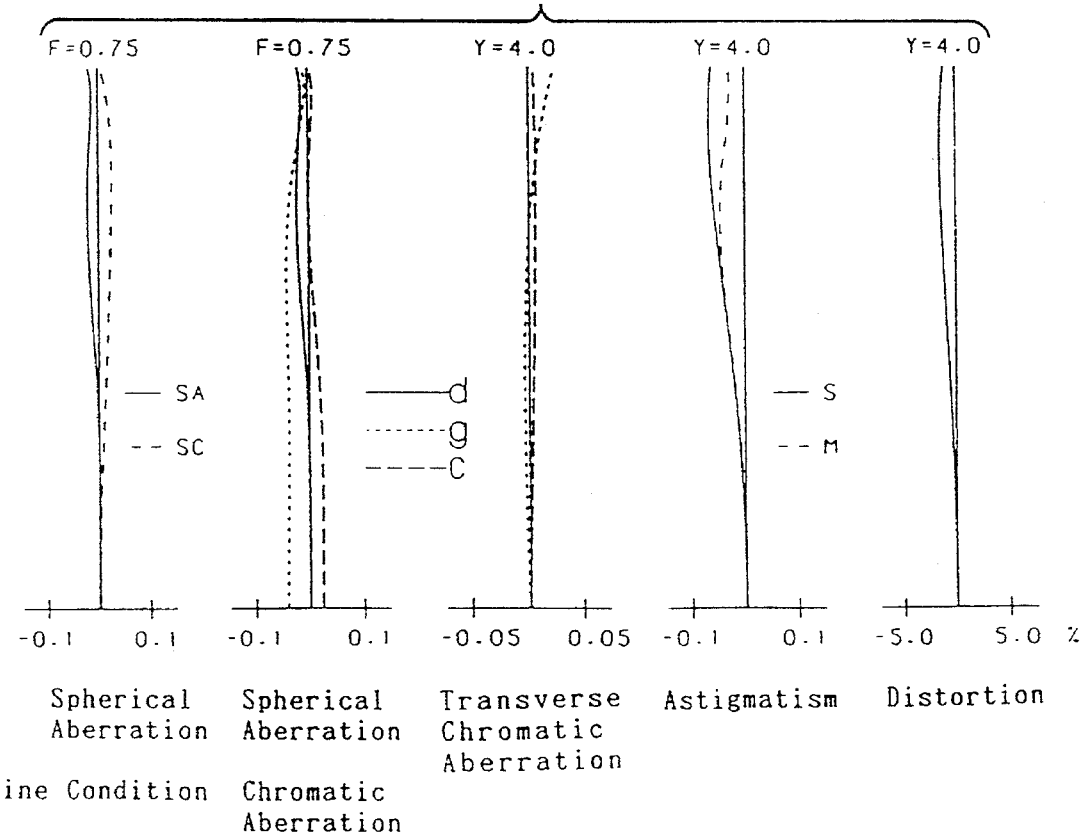
FIG. 6 shows diagrams of various aberrations in the fast aspherical lens system shown in FIG. 5.

Numerical data of the lens system shown in FIG. 5 is shown in Table 3 below. Diagrams of various aberrations of the lens system are shown in FIG. 6.

TABLE 3

$F_{NO} = 1:0.75$
$f = 6.20$
$\omega = 33.1$
$F_B = d_{15} + d_{16}$ (in glass) = 11.58

| surface No. | r | d | N | ν |
|---|---|---|---|---|
| 1 | 56.594 | 2.00 | 1.80400 | 46.6 |
| 2 | 11.115 | 2.30 | | |
| 3 | 15.508 | 2.00 | 1.59015 | 61.4 |
| 4 | *11.516 | 2.46 | | |
| 5 | 44.149 | 4.67 | 1.84666 | 23.8 |
| 6 | 27.734 | 0.10 | | |
| 7 | 15.177 | 3.63 | 1.84666 | 23.8 |
| 8 | 8.706 | 18.83 | | |
| 9 | −116.515 | 6.24 | 1.77250 | 49.6 |
| 10 | 19.825 | 0.10 | | |
| 11 | 56.922 | 1.50 | 1.84666 | 23.9 |
| 12 | 12.677 | 9.11 | 1.74100 | 52.7 |
| 13 | 65.032 | 0.10 | | |
| 14 | *13.690 | 5.37 | 1.66910 | 55.4 |
| 15 | 78.206 | 5.58 | | |
| 16 | ∞ | 6.00 | 1.49782 | 66.8 |
| 17 | ∞ | | | |

*marked surfaces are aspherical surface no. 4;

$K=0.0$, $A4=-0.11048\times10^{-3}$, $A6=-0.59261\times10^{-6}$,
$A8=-0.62026\times10^{-9}$, $A10=-0.60730\times10^{-10}$, $A12=0.0$ surface no.14;

$K=0.0$, $A4=-0.10222\times10^{-4}$, $A6=0.95822\times10^{-7}$,
$A8=-0.22265\times10^{-8}$, $A10=0.12981\times10^{-10}$, $A12=0.0$

Figure 7:
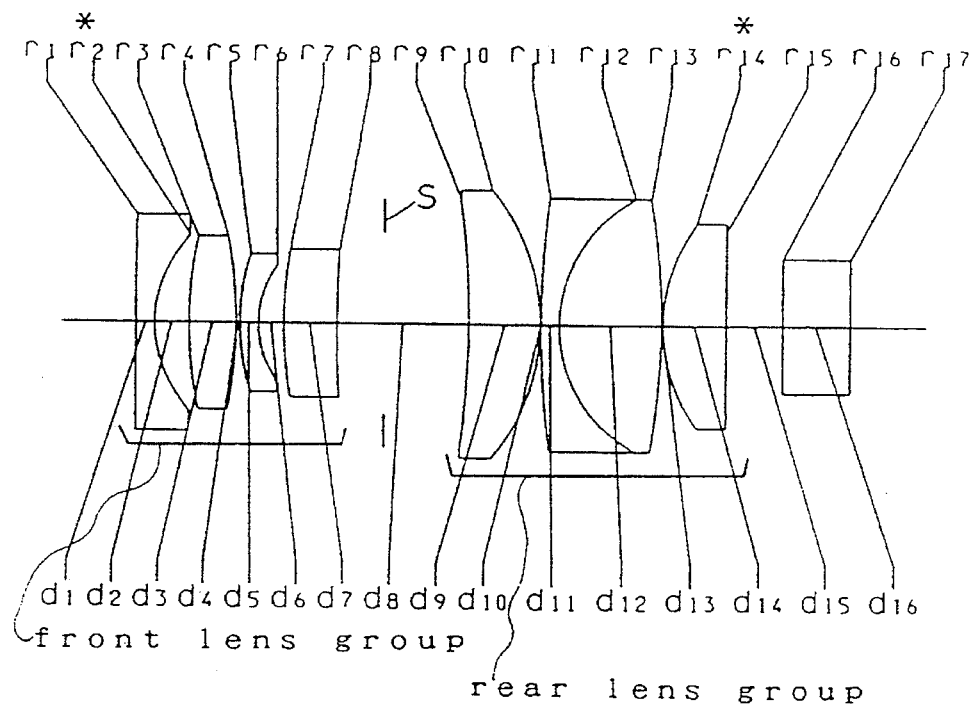
FIG. 7 is a schematic view of a lens arrangement of the fast aspherical lens system according to a fourth embodiment of the present invention.

Fourth Embodiment:

FIG. 7 shows a lens arrangement of a fast aspherical lens system according to a fourth embodiment of the present invention.

Figure 8:
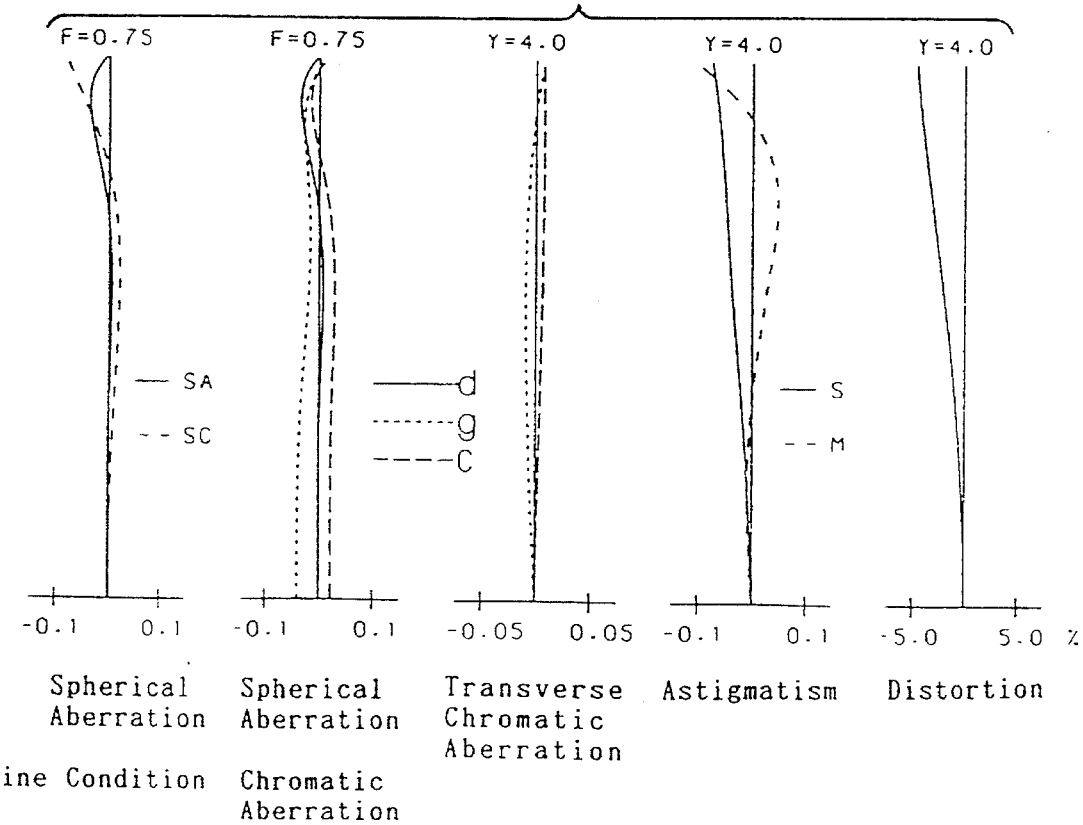
FIG. 8 shows diagrams of various aberrations in the fast aspherical lens system shown in FIG. 7.

Numerical data of the lens system shown in FIG. 7 is shown in Table 4 below. Diagrams of various aberrations thereof are shown in FIG. 8.

TABLE 4

$F_{NO} = 1:0.75$
$f = 6.20$
$\omega = 34.1$
$F_B = d_{15} + d_{16}$ (in glass) = 11.01

| surface No. | r | d | N | ν |
|---|---|---|---|---|
| 1 | 1000.000 | 1.61 | 1.59000 | 61.1 |
| 2 | *9.691 | 3.01 | | |
| 3 | 35.140 | 4.07 | 1.84666 | 23.8 |
| 4 | 39.336 | 0.35 | | |
| 5 | 20.213 | 1.53 | 1.80000 | 0.0 |
| 6 | 8.467 | 2.19 | | |
| 7 | 35.919 | 4.59 | 1.84000 | 0.0 |
| 8 | 115.979 | 11.25 | | |
| 9 | 76.231 | 6.23 | 1.80400 | 46.6 |
| 10 | 17.675 | 0.10 | | |
| 11 | 86.435 | 1.50 | 1.84666 | 23.9 |
| 12 | 12.255 | 8.93 | 1.77250 | 49.6 |
| 13 | 60.601 | 0.10 | | |
| 14 | *14.034 | 5.53 | 1.66910 | 55.4 |
| 15 | 3881.363 | 5.01 | | |
| 16 | ∞ | 6.00 | 1.49782 | 66.8 |
| 17 | ∞ | | | |

*marked surfaces are aspherical surface no. 2;

$K=0.0$, $A4=-0.10916\times10^{-3}$, $A6=0.55423\times10^{-7}$,
$A8=-0.20910\times10^{-7}$, $A10=0.43745\times10^{-10}$, $A12=0.0$ surface no.14;

$K=0.0$, $A4=-0.18124\times10^{-4}$, $A6=-0.26403\times10^{-6}$,
$A8=0.44781\times10^{-8}$, $A10=-0.31702\times10^{-10}$, $A12=0.0$

Figure 9:
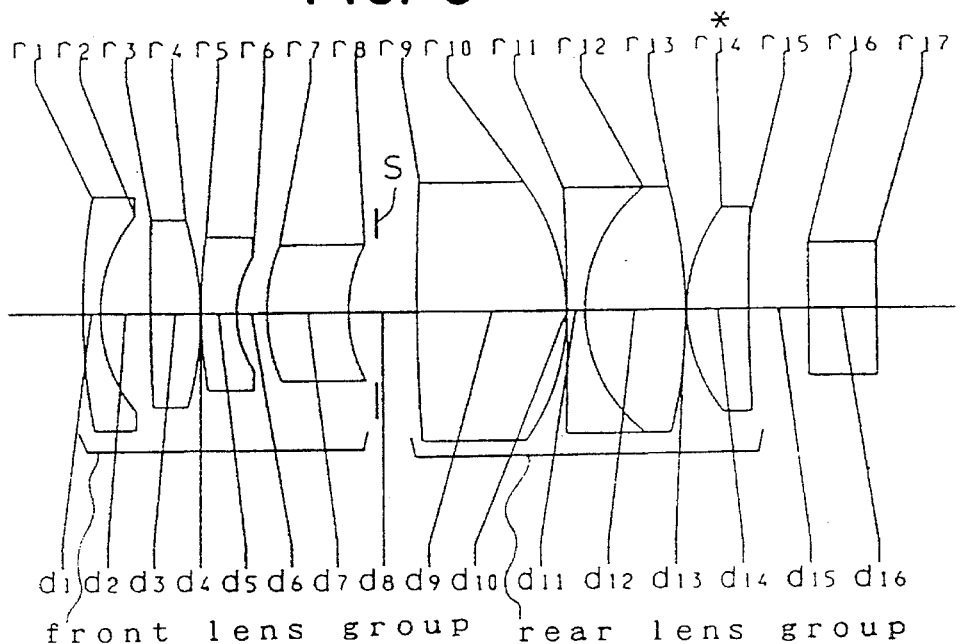
FIG. 9 is a schematic view of a lens arrangement of the fast aspherical lens system according to a fifth embodiment of the present invention; and, FIG. 10 shows diagrams of various aberrations in the fast aspherical lens system shown in FIG. 9.

Fifth Embodiment:

FIG. 9 shows a lens arrangement of the fast aspherical lens system according to a fifth embodiment of the present invention.

Figure 10:
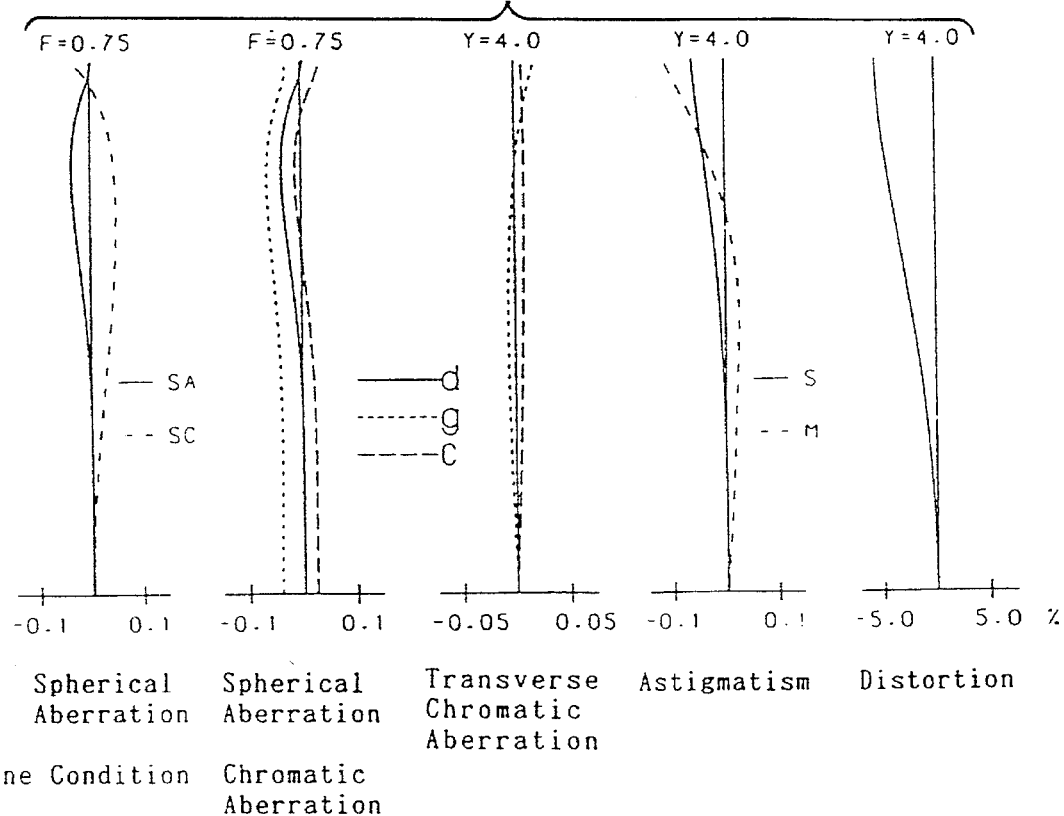

Numerical data of the lens system shown in FIG. 9 is shown in Table 5 below. Diagrams of various aberrations of the lens system are shown in FIG. 10.

TABLE 5

$F_{NO} = 1:0.75$
$f = 6.20$
$\omega = 34.4$
$F_B = d_{15} + d_{16}$ (in glass) = 11.29

| surface No. | r | d | N | ν |
|---|---|---|---|---|
| 1 | 55.255 | 1.60 | 1.69680 | 55.5 |
| 2 | 13.315 | 4.30 | | |
| 3 | 218.535 | 4.07 | 1.84666 | 23.8 |
| 4 | 28.353 | 0.10 | | |
| 5 | 44.462 | 3.07 | 1.59551 | 39.2 |
| 6 | 8.800 | 2.65 | | |
| 7 | 14.950 | 7.13 | 1.84666 | 23.8 |
| 8 | 12.405 | 5.91 | | |
| 9 | 180.410 | 13.48 | 1.88300 | 40.8 |
| 10 | 18.539 | 0.10 | | |
| 11 | −215.383 | 1.50 | 1.84666 | 23.8 |
| 12 | 13.326 | 8.86 | 1.80400 | 46.6 |
| 13 | 42.042 | 0.10 | | |
| 14 | *13.265 | 5.60 | 1.66910 | 55.4 |
| 15 | 154.652 | 5.29 | | |
| 16 | ∞ | 6.00 | 1.49782 | 66.8 |
| 17 | ∞ | | | |

*marked surface is aspherical surface no.14;

$K=0.0$, $A4=-0.21706\times10^{-4}$, $A6=-0.18356\times10^{-8}$,
$A8=-0.83516\times10^{-9}$, $A10=-0.40244\times10^{-11}$, $A12=0.0$ The values of the formulae (1) through (13) corresponding to the first through fifth embodiments are shown in table 6 below.

TABLE 6

| | \multicolumn{5}{c}{EMBODIMENTS} | | | | |
|---|---|---|---|---|---|
| | 1 | 2 | 3 | 4 | 5 |
| formula 1 | −0.32 | −0.34 | −0.30 | −0.30 | −0.46 |
| formula 2 | 5.76 | 5.79 | 5.81 | 4.61 | 4.69 |
| formula 3 | 3.79 | 3.88 | 3.62 | 3.61 | 4.78 |
| formula 4 | −0.275 | −0.525 | −0.257 | −0.362 | −0.51 |
| formula 5 | 0.12 | 0.004 | 0.12 | 0.064 | 0.029 |
| formula 6 | 1.738 | 1.722 | 1.728 | 1.749 | 1.785 |
| formula 7 | 1.847 | 1.847 | 1.847 | 1.847 | 1.847 |
| formula 8 | −2.96 | −2.58 | −3.20 | −2.85 | −2.99 |
| formula 9 | 2.29 | 2.33 | 2.21 | 2.26 | 2.14 |
| formula 10 | 1.99 | 2.07 | 2.04 | 1.98 | 2.15 |
| formula 11 | 1.33 | 1.20 | 1.40 | — | — |
| formula 12 | — | — | — | 1.37 | — |
| formula 13 | — | — | — | — | 1.42 |

As can be seen from Table 6 above, all the five embodiments satisfy the conditions (1) through (13). Moreover, in the present invention, the f-number of the fast aspherical lens system is around F0.75, which is very small. And the aberrations can be sufficiently compensated.

As may be understood from the above discussion, according to the present invention, a lens arrangement including a front lens group, a diaphragm and a rear lens group, with at least one lens having diverging aspherical surface, a fast wide angle lens having f-number around F0.75 can be obtained when the conditions recited in the claims of the specification are satisfied.

We claim:
1. An aspherical lens system comprising:

a front lens group having a negative power, a diaphragm, and a rear lens group having a positive power, located in this order from an object side of the lens system, at least one lens having diverging aspherical surface is provided, in which the following conditions are satisfied;

$$-0.6 < f/f_F < -0.2 \tag{1}$$

$$3.0 < \Sigma d_{F+S}/f < 8.0 \tag{2}$$

$$3.0 < \Sigma d_R/f < 6.0 \tag{3}$$

$$-0.9 < \Delta I_{ASP} < -0.1 \tag{4}$$

wherein, f represents a focal length of the entire lens system, $f_F$ represents a focal length of the front lens group, $\Sigma d_{F+S}$ represents a sum of the thickness of the front lens group and the distance between the front lens group and the rear lens group, $\Sigma d_R$ represents a thickness of the rear lens group, $\Delta I_{ASP}$ represents an aberration factor of the aspherical surface term of the third-order spherical aberration factor of the aspherical lens (aberration factor when the reduced focal length is 1.0).

2. The lens system of claim 1, wherein said lens having an aspherical surface is provided in the rear lens group and satisfies the following condition (5);

$$|I_{SP}/\Delta I_{ASP}| < 0.3 \tag{5}$$

wherein $I_{SP}$ represents an aberration factor of the spherical surface term of a third-order spherical aberration factor of the aspherical lens.

3. The lens system of claim 1, wherein said rear lens group comprises three lens groups assembled of four lenses, a first positive lens in which a surface facing an image is convex, a cemented lens assembly including a second negative and a third positive lens in which a cemented surfaces of said negative and positive lens is concave with regard to the image surface, and a fourth positive lens in which a surface facing an object is convex, in which the following conditions are satisfied;

$$1.67 < N_P \tag{6}$$

$$1.75 < N_N \tag{7}$$

$$-4.0 < r_{R1-2}/f < -1.9 \tag{8}$$

$$1.5 < r_{R3-1}/f < 3.0 \tag{9}$$

$$1.5 < r_{RC}/f < 3.0 \tag{10}$$

wherein, $N_P$ represents a mean value of the refractive index of the positive lens of the rear lens group, $N_N$ represents a refractive index of the negative lenses of the rear lens group, $r_{R1-2}$ represents a radius of curvature of the surface of the first lens nearer the image surface in the rear lens group, $r_{RC}$ represents a radius of curvature of the cementing surface of the cemented lens assembly in the rear lens group, $r_{R3-1}$ represents a radius of curvature of a surface of the terminal lens nearer the object in the rear lens group.

4. The lens system of claim 1, wherein said front lens group comprises four lenses, a first lens of negative power, a second lens of negative power, a third lens of positive power and a fourth lens of negative power, located in this order from the object side, and wherein said fourth negative lens is a negative meniscus lens having a concave surface facing the image surface and satisfies the following condition;

$$1.0 < r_{F4-2}/f < 2.0 \tag{11}$$

wherein, $r_{F4-2}$ represents a radius of curvature of a surface of the fourth lens nearer the image surface in the front lens group.

5. The lens system of claim 1, wherein said front lens group comprises four lenses, a first lens of negative power, a second lens of positive power, a third lens of negative power and a fourth lens of positive power, located in this order from the object side, and wherein said third lens is a negative meniscus lens having a concave surface facing the image surface and satisfies the following condition (12), $$1.0 < r_{F3-2}/f < 2.0 \tag{12}$$

wherein, $r_{F3-2}$ represents a radius of curvature of the surface of the third lens nearer the image surface in the front lens group.

6. The lens system of claim 1, wherein said front lens group comprises four lenses, a first lens of negative power, a second lens of positive power, a third lens of negative power, and a fourth lens of negative power located in this order from the object side, and wherein said third lens is a negative meniscus lens having a concave surface facing the image surface and satisfies the following formula (13);

$$1.0 < r_{F3-2}/f < 2.0 \tag{13}$$

wherein, $r_{F3-2}$ represents a radius of curvature of a surface of the third lens nearer the image surface in the front lens group.

7. The aspherical lens system according to claim 1, said front lens group and said rear lens group defining a lens system having a single focal length.

8. The aspherical lens system according to claim 1, said front lens group and said rear lens group defining a fixed focal length optical system.

9. The aspherical lens system according to claim 1, said rear lens group comprising three lens groups of four lenses, a first, positive lens including a convex surface facing an image, a cemented lens assembly including a second, negative and a third, positive lens, a cemented surface of said second, negative and said third, positive lenses being concave with respect to the image, and a fourth, positive lens having a convex surface facing an object.

* * * * *

UNITED STATES PATENT AND TRADEMARK OFFICE
CERTIFICATE OF CORRECTION

PATENT NO. : 5,513,045
DATED : April 30, 1996
INVENTOR(S) : T. ITO et al.

It is certified that error appears in the above-indentified patent and that said Letters Patent is hereby corrected as shown below:

On the cover page: section [73], "Assignee", line 2, after "Kaisha" insert ---; and Asahi Seimitsu Kabushiki Kaisha---.

On the cover page: section [73], "Assignee", line 2, before "Tokyo," insert ---both of---.

On the cover page: section [57], ABSTRACT", line 8, change "-0.6<f/f$_{p'}$<-0.2;tm(1)" to ---0.6<f/f$_{p'}$<-0.2---. The term "(1)" should appear flush with the right margin.

Signed and Sealed this

Seventh Day of January, 1997

Attest:

BRUCE LEHMAN

*Attesting Officer*   *Commissioner of Patents and Trademarks*